(12) United States Patent
Togawa et al.

(10) Patent No.: US 6,312,312 B1
(45) Date of Patent: Nov. 6, 2001

(54) POLISHING APPARATUS

(75) Inventors: Tetsuji Togawa, Chigasaki; Nobuyuki Takada, Fujisawa; Seiji Katsuoka, Atsugi; Hiroyuki Osawa, Kawasaki, all of (JP)

(73) Assignee: Ebara Corporation, Tokyo (JP)

( * ) Notice: Subject to any disclaimer, the term of this patent is extended or adjusted under 35 U.S.C. 154(b) by 0 days.

(21) Appl. No.: 09/175,561

(22) Filed: Oct. 20, 1998

(30) Foreign Application Priority Data

Oct. 20, 1997 (JP) .................................................. 9-304899
Jun. 2, 1998 (JP) .................................................. 10-169285

(51) Int. Cl.$^7$ ...................................................... B24B 7/22
(52) U.S. Cl. .................................. 451/5; 451/288; 451/41
(58) Field of Search ........................ 451/5, 288, 289, 451/287, 41, 398, 388

(56) References Cited

U.S. PATENT DOCUMENTS

| 4,944,119 | | 7/1990 | Gill, Jr. et al. . | |
| 5,329,732 | * | 7/1994 | Karlsrud et al. | 451/289 |
| 5,618,354 | * | 4/1997 | Lofaro | 451/388 |
| 5,655,954 | * | 8/1997 | Oishi et al. | 451/67 |
| 5,738,574 | | 4/1998 | Tolles et al. . | |
| 5,934,984 | * | 8/1999 | Togawa et al. | 451/288 |

OTHER PUBLICATIONS

U.S. application No. 08/806,622, filed Feb. 26, 1997, entitled "Polishing Apparatus", by Tetsuji Togawa et al.

* cited by examiner

Primary Examiner—Robert A. Rose
(74) Attorney, Agent, or Firm—Wenderoth, Lind & Ponack, L.L.P.

(57) ABSTRACT

A polishing apparatus is used for polishing a workpiece such as a semiconductor wafer to a flat mirror finish. The polishing apparatus includes a turntable having a polishing surface, a top ring for supporting the workpiece to be polished and pressing the workpiece against the polishing surface, and a transferring device for transferring the workpiece between the top ring and the transferring device. The transferring device includes a stage having a support surface for supporting the workpiece, an actuating unit for moving the stage in a vertical direction, and a guide member disposed radially outwardly of the stage and having a guide surface of an inverted conical shape. The centering of the workpiece is conducted by bringing a periphery of the workpiece into contact with the guide surface, and then the workpiece is transferred from the transferring device to the top ring by raising the stage.

16 Claims, 12 Drawing Sheets

F I G. 4
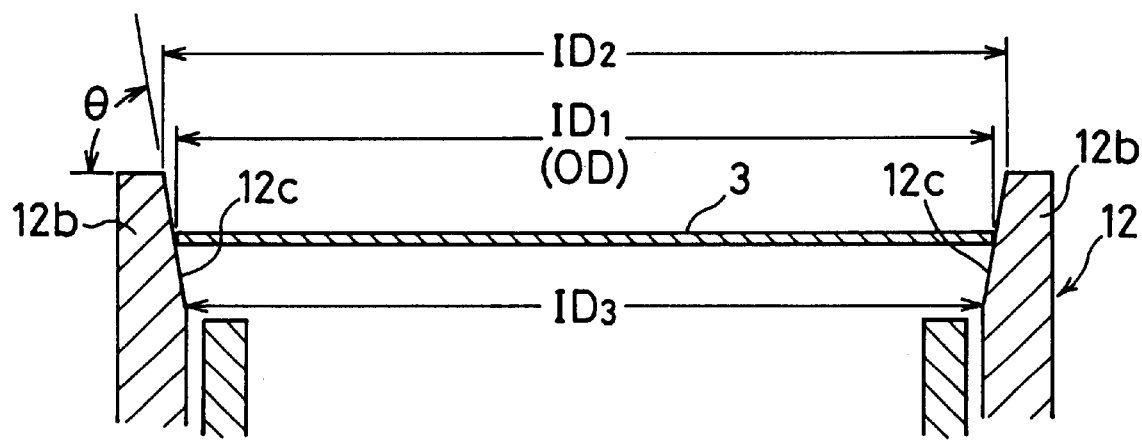

F I G. 6
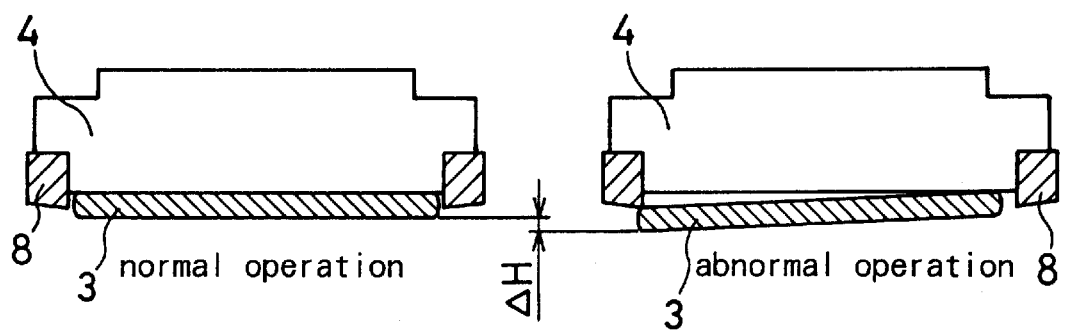

POLISHING APPARATUS

BACKGROUND OF THE INVENTION

1. Field of the Invention

The present invention relates to a polishing apparatus for polishing a workpiece such as a semiconductor wafer to a flat mirror finish, and more particularly to a polishing apparatus having a transferring device for transferring a workpiece between a top ring and a robot associated with the polishing apparatus.

2. Description of the Related Art

Recent rapid progress in semiconductor device integration demands smaller and smaller wiring patterns or interconnections and also narrower spaces between interconnections which connect active areas. One of the processes available for forming such interconnections is photolithography. Though the photolithographic process can form interconnections that are at most 0.5 µm wide, it requires that surfaces on which pattern images are to be focused by a stepper be as flat as possible because the depth of focus of the optical system is relatively small.

It is therefore necessary to make the surfaces of semiconductor wafers flat for photolithography. One customary way of flattening the surfaces of semiconductor wafers is to polish them with a polishing apparatus.

Conventionally, a polishing apparatus has a turntable and a top ring which rotate at respective individual speeds. A polishing cloth is attached to the upper surface of the turntable. A semiconductor wafer to be polished is placed on the polishing cloth and clamped between the top ring and the turntable. An abrasive liquid containing abrasive grains is supplied onto the polishing cloth and retained on the polishing cloth. During operation, the top ring exerts a certain pressure on the turntable, and the surface of the semiconductor wafer held against the polishing cloth is therefore polished by a combination of chemical polishing and mechanical polishing to a flat mirror finish while the top ring and the turntable are rotated.

It has been customary to install a robot to transfer a semiconductor wafer therefrom to the top ring before it is polished, and to transfer the semiconductor wafer from the top ring thereto after it is polished. That is, the semiconductor wafer is transferred directly between the top ring and the hand of the robot which is associated with the polishing apparatus.

However, to transfer a semiconductor wafer directly between the top ring and the hand of the robot causes a conveyance error because the top ring and the robot usually have irregularities in conveying accuracy.

In order to improve the conveying accuracy of the top ring and the robot, it is preferable to install a transferring device, a so-called pusher, at a transfer position for the semiconductor wafer. In this case, the pusher has a function to place thereon a semiconductor wafer to be polished which has been conveyed by the hand of the robot, and then to lift and transfer the semiconductor wafer onto the top ring which has been moved over the pusher. Further, the pusher has another function to receive the semiconductor wafer which has been polished from the top ring, and then to transfer the semiconductor wafer onto the hand of the robot.

The pusher comprises a support table which has a support surface for supporting the lower surface of the semiconductor wafer and a plurality of guide pins disposed slightly outwardly of the support surface and having a tapered surface at a tip end thereof, and an actuating mechanism for vertically moving the support table.

When the pusher receives the semiconductor wafer from the robot, the semiconductor wafer is placed on the support surface while being guided by the guide pins. Since the associated members including the guide pins and the support table are dimensioned such that a slight clearance is formed between the guide pins and the semiconductor wafer, the semiconductor wafer is smoothly placed on the support surface of the support table. Thereafter, the semiconductor wafer is transferred to the top ring which is positioned above the support table and is in a standby condition.

In the conventional top ring, a retainer ring (or guide ring) is provided on the lower circumferential portion of the top ring to retain the semiconductor wafer, and the retainer ring is dimensioned such that the inner diameter of the retainer ring is relatively larger than the outer diameter of the semiconductor wafer. That is, a relatively large clearance (or play) is formed between the inner circumferential surface of the retainer ring and the outer periphery of the semiconductor wafer. Therefore, even if the center of the semiconductor wafer placed on the pusher and the center of the top ring are not properly aligned, the semiconductor wafer can be transferred from the pusher to the top ring. Conversely, also in case of transferring the semiconductor wafer from the top ring to the pusher, even if the center of the semiconductor wafer held by the top ring and the center of the support surface of the pusher are not properly aligned, the semiconductor wafer can be transferred from the top ring to the pusher by the function of the guide pins.

However, as semiconductor device integration progresses further, demand on enhancing uniformity of the polished surface of the semiconductor wafer is becoming strict. It follows that the center of the semiconductor wafer and the center of the top ring must be properly aligned to enhance the uniformity of polishing, and thus to enhance the uniformity of the polished surface of the semiconductor wafer by making a clearance between the inner circumferential surface of the retainer ring and the outer periphery of the semiconductor wafer as small as possible.

However, if the clearance between the inner circumferential surface of the retainer ring and the outer periphery of the semiconductor wafer is small, then the semiconductor wafer may not be properly placed within the retainer ring to cause a conveyance error when the semiconductor wafer is transferred to the top ring. In such case, the semiconductor wafer starts to be polished in such a state that a portion of the semiconductor wafer is placed on the lower surface of the retainer ring, thus causing crack in or damage to the semiconductor wafer.

SUMMARY OF THE INVENTION

It is therefore an object of the present invention to provide a polishing apparatus having a transferring device which can improve a transfer accuracy of a workpiece such as a semiconductor wafer without causing a conveyance error when transferring the workpiece between the top ring and the hand of the robot.

Another object of the present invention is to provide a polishing apparatus having a transferring device which can detect a conveyance error when transferring a workpiece such as a semiconductor wafer between the transferring device and the top ring and do such conveyance over again.

Still another object of the present invention is to provide a polishing apparatus in which no previous strict positional adjustment is required between the transferring device and the top ring, and a transfer position can be easily set.

According to one aspect of the present invention, there is provided a polishing apparatus for polishing a surface of a workpiece comprising: a turntable having a polishing surface; a top ring for supporting the workpiece to be polished and pressing the workpiece against the polishing surface; and a transferring device for transferring the workpiece between the top ring and the transferring device; the transferring device comprising: a stage having a support surface for supporting the workpiece; a first actuating mechanism for moving the stage in a vertical direction; and a guide member disposed radially outwardly of the stage and having a guide surface of an inverted conical shape which performs centering of the workpiece by bringing a periphery of the workpiece into contact with the guide surface.

With the above arrangement, after the centering of the semiconductor wafer is made, the semiconductor wafer is transferred from the transferring device to the top ring or from the transferring device to the robot hand. Therefore, error in transfer of the semiconductor wafer can be prevented from occurring.

According to another aspect of the present invention, there is provided a polishing apparatus for polishing a surface of a workpiece comprising: a turntable having a polishing surface; a top ring for supporting the workpiece to be polished and pressing the workpiece against the polishing surface; and a transferring device for transferring the workpiece between the top ring and the transferring device; the transferring device comprising: a stage having a support surface for supporting the workpiece; a first actuating unit for moving the stage in a vertical direction; a guide member disposed radially outwardly of the stage and having a guide surface; and a sensor for detecting a vertical position of the stage; wherein when the stage supporting the workpiece is raised toward the top ring to transfer the workpiece to the top ring, the sensor detects whether or not the stage is raised up to a predetermined position.

With the above arrangement, if an error in transfer of the semiconductor wafer occurs, such error can be detected, and then the transfer operation of the semiconductor wafer can be done over again on the basis of the detected result. Therefore, damage to the semiconductor wafer caused by the transfer error can be prevented from occurring.

According to a preferred embodiment, the polishing apparatus further comprises a slider mechanism for moving the stage and the guide member within a horizontal plane; and a first positioning mechanism for positioning the stage and the guide member with respect to the top ring when the workpiece is transferred between the transferring device and the top ring.

With the above arrangement, when the workpiece is transferred between the transferring device and the top ring, the stage and the guide member are positioned with respect to the top ring by the first positioning mechanism. At this time, the stage and the guide member are moved in a horizontal plane by the slider mechanism, whereby optimum positioning between the stage and the guide member, and the top ring can be automatically carried out.

The above and other objects, features, and advantages of the present invention will become apparent from the following description when taken in conjunction with the accompanying drawings which illustrate a preferred embodiment of the present invention by way of example.

BRIEF DESCRIPTION OF THE DRAWINGS

FIG. 4 is a schematic cross-sectional view showing the relationship between a guide surface of a guide member in the transferring device and a semiconductor wafer;

FIG. 6 is a vertical cross-sectional view showing the relationship between the top ring and the semiconductor wafer which is in a normal operation (left side) and an abnormal operation (right side) according to the first and second embodiments of the present invention.

DETAILED DESCRIPTION OF THE PREFERRED EMBODIMENT

A polishing apparatus according to a first embodiment of the present invention will be described below with reference to FIGS. 1 through 6.

Figure 1:
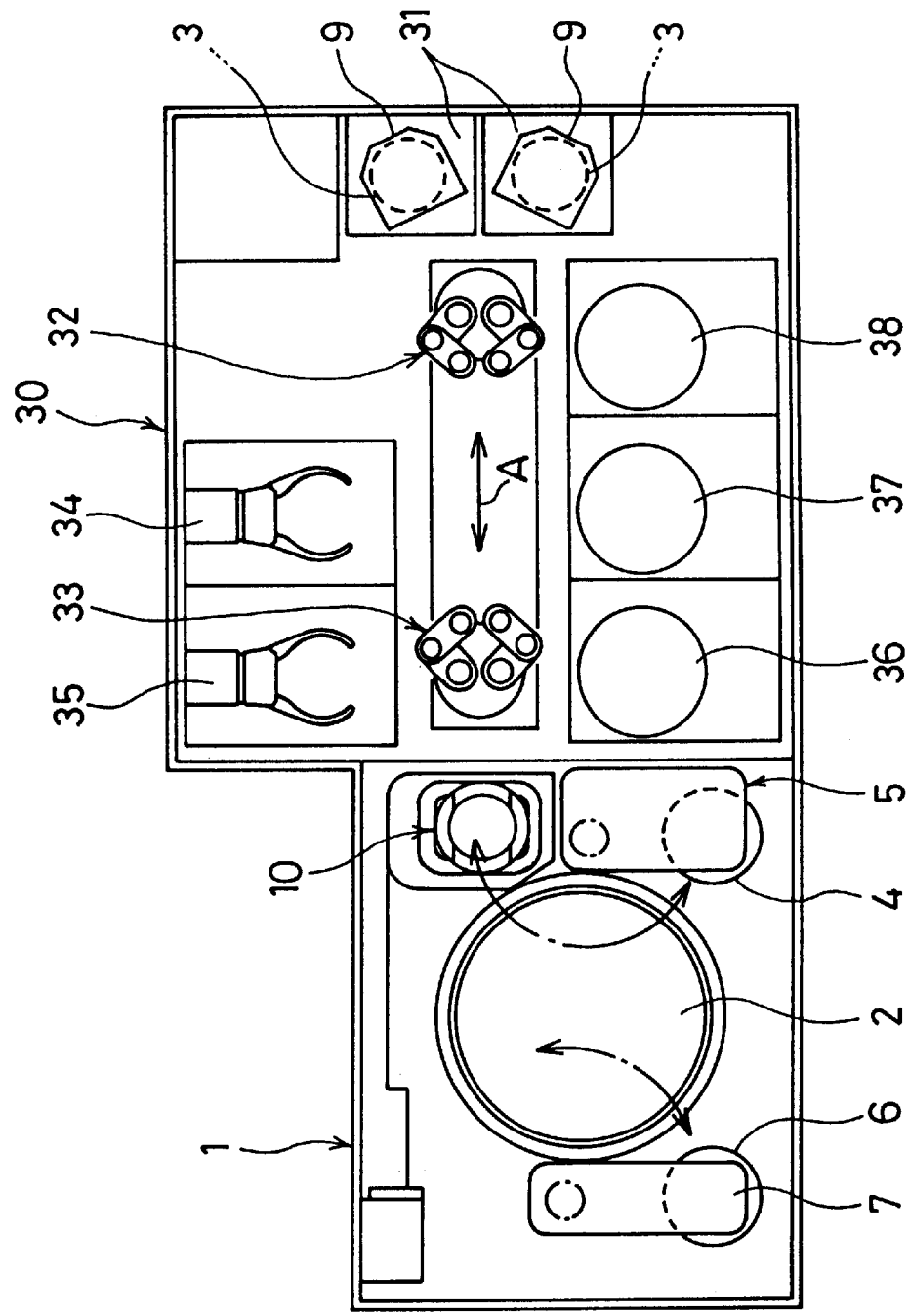
FIG. 1 is a plan view of a polishing apparatus having a transferring device according to first and second embodiments of the present invention.

As shown in FIG. 1, a polishing apparatus comprises a polishing section 1 for polishing a semiconductor wafer, and a cleaning section 30 for cleaning the semiconductor wafer which has been polished in the polishing section 1. The polishing section 1 comprises a turntable 2 disposed centrally, a top ring unit 5 positioned on one side of the turntable 2 and having a top ring 4 for holding a semiconductor wafer 3, and a dressing unit 7 positioned on the other side of the turntable 2 and having a dressing tool 6. The polishing apparatus has a pusher 10 disposed adjacent to the top ring unit 5 and the turntable 2. The pusher 10 constitutes a transferring device.

The cleaning section 30 comprises a loading/unloading stage 31 for placing thereon wafer cassettes 9 housing a plurality of semiconductor wafers 3, two workpiece conveying robots 32 and 33 disposed centrally and movable in the directions indicated by the arrow A, two workpiece reversing units 34 and 35 disposed on one side of the workpiece conveying robots 32 and 33, and a primary, secondary and tertiary cleaning devices 36, 37 and 38 which are disposed on the other side of the workpiece conveying robots 32 and 33.

In the polishing apparatus shown in FIG. 1, when a wafer cassette 9 which houses a plurality of semiconductor wafers 3 to be polished is set on the loading/unloading stage 31, the workpiece conveying robot 32 takes out a semiconductor wafer 3 from the cassette 9, and transfers the semiconductor wafer 3 to the workpiece reversing unit 34. After the semiconductor wafer is reversed, i.e., turned upside down, by the workpiece reversing unit 34, it is received by the workpiece conveying robot 33, and then placed onto the pusher 10 by the workpiece conveying robot 33.

Thereafter, the top ring 4 of the top ring unit 5 is angularly displaced as indicated by the dot-and-dash line to a position directly above the pusher 10. The semiconductor wafer on the pusher 10 is lifted to a position near a lower surface of the top ring 4, and then attached to the top ring 4 under vacuum developed by a vacuum pump or the like (not shown).

Then, the top ring 4 is moved over the turntable 2, and presses the semiconductor wafer against a polishing surface comprising a polishing cloth on the turntable 2. While the turntable 2 and the top ring 4 are rotated independently of each other, the lower surface of the semiconductor wafer 3 is polished to a flat mirror finish. After the semiconductor wafer 3 is polished, the top ring 4 is moved back over the pusher 10, and transfers the polished semiconductor wafer onto the pusher 10.

The semiconductor wafer 3 placed on the pusher 10 is then held by the workpiece conveying robot 33, and transferred therefrom to the workpiece reversing unit 35. The workpiece reversing unit 35 reverses the semiconductor wafer 3. The reversed semiconductor wafer is transferred by the workpiece conveying robots 33 and 32 successively to the primary, secondary and tertiary cleaning devices 36, 37 and 38, whereby it is cleaned and dried. The cleaned and dried semiconductor wafer 3 is finally returned to the cassette 9 on the loading/unloading stage 31 by the workpiece conveying robot 32.

Figure 2:
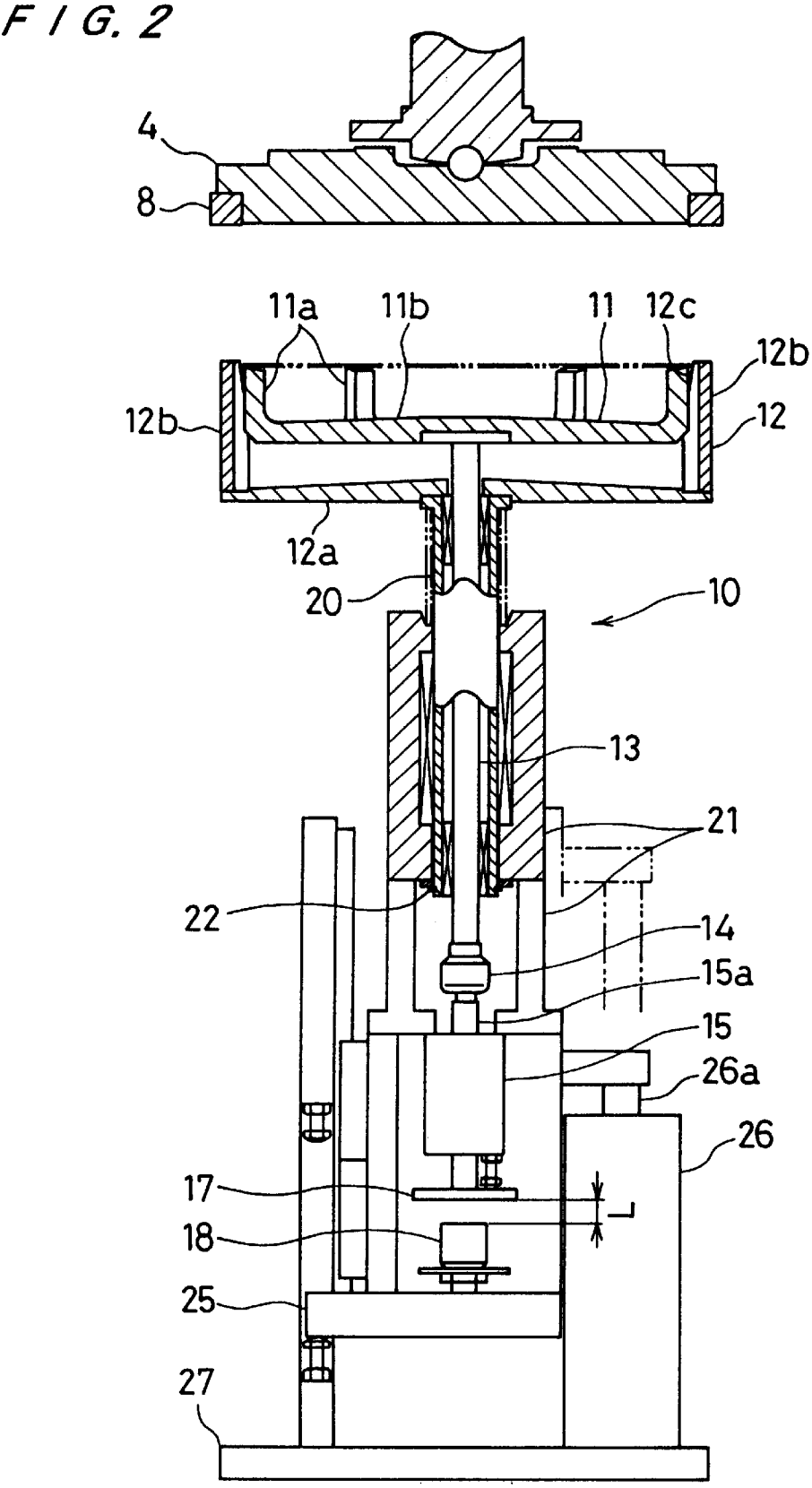
FIG. 2 is a vertical cross-sectional view of the transferring device according to the first embodiment of the present invention.
Figure 3:
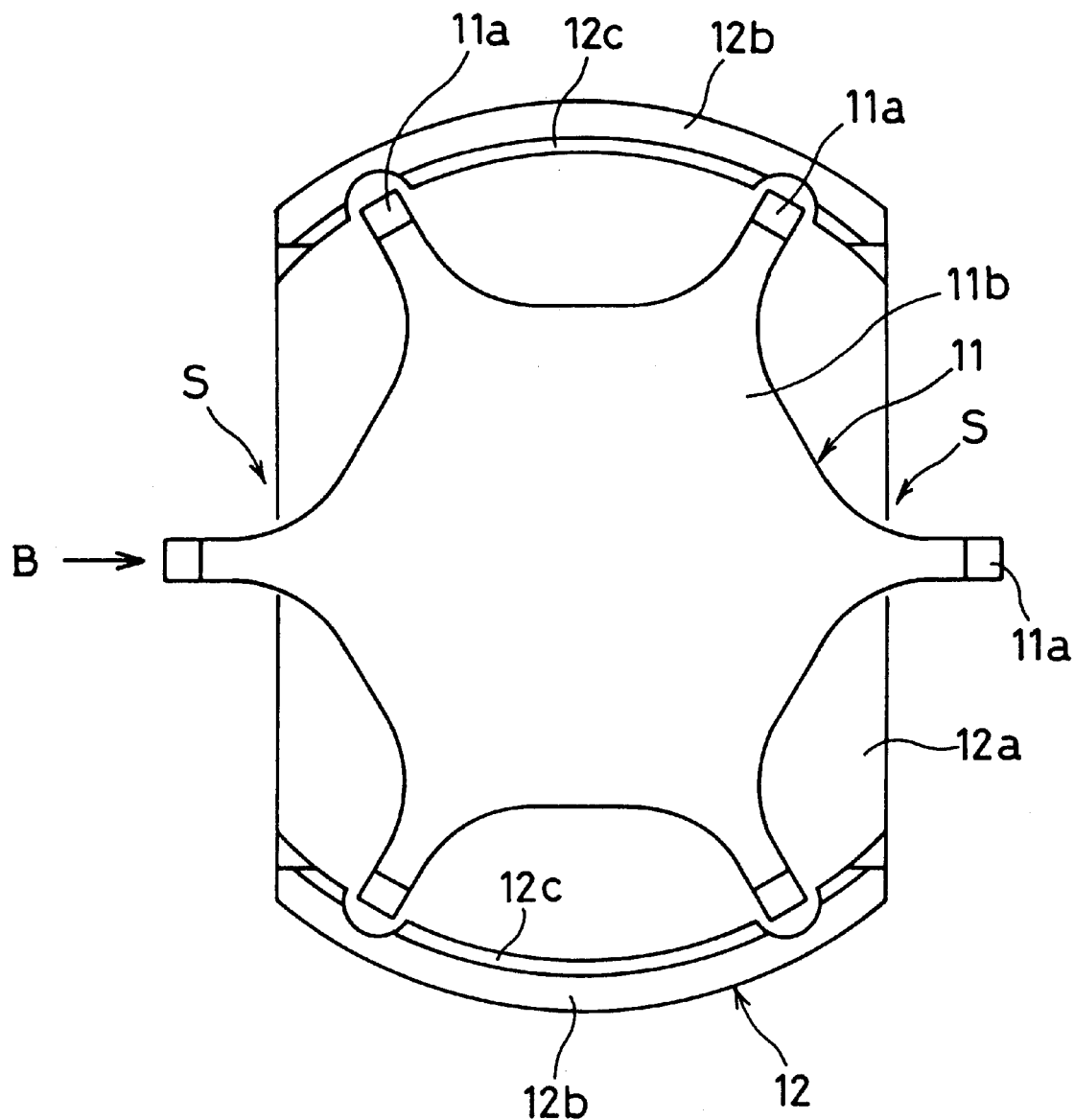
FIG. 3 is a plan view of the transferring device shown in FIG. 2.

FIGS. 2 and 3 show the pusher 10 in the polishing apparatus shown in FIG. 1 at enlarged scale. FIG. 2 is a cross-sectional view of the pusher 10, and FIG. 3 is a plan view of the pusher 10. FIG. 2 shows the state in which the top ring 4 is positioned above the pusher 10. A retainer (or guide) ring 8 is provided on the lower peripheral portion of the top ring 4 to retain the semiconductor wafer therein.

As shown in FIGS. 2 and 3, the pusher 10 comprises a pusher stage 11 having six wafer supports 11a extending upwardly from a base portion 11b, and a guide member 12 positioned radially outwardly of the pusher stage 11 and having guide surfaces 12c of an inverted conical shape, i.e., an upwardly extending and outwardly sloped circular shape. The upper surfaces of the wafer supports 11a of the pusher stage 11 support the lower surface of the semiconductor wafer 3. The guide member 12 comprises a base 12a made of thin plate having an oblong shape, and a pair of guide portions 12b extending upwardly from the base 12a and having an arcuate horizontal cross-section. The guide portions 12b have respective guide surfaces 12c of an upwardly spread conical shape at the upper inner circumferential surfaces thereof. As shown in FIG. 3, the two opposite portions S of the guide member 12 where the guide portions 12b are not located are open so that a robot hand can be inserted therethrough.

FIG. 4 shows the relationship between the guide surfaces 12c of the guide member 12 and the semiconductor wafer 3. The inverted conical-shaped guide surfaces 12c are arranged at an angle (θ) of approximately 60° to 80°. The inner diameter $ID_1$ of the central portion of the guide surfaces 12c is arranged to be equal to the nominal diameter OD of the semiconductor wafer 3. The inner diameter $ID_2$ of the upper end portion of the guide surfaces 12c is larger than the maximum diameter of the semiconductor wafer 3, considering tolerances of the size of the semiconductor wafer. The inner diameter $ID_3$ of the lower end portion of the guide surfaces 12c is smaller than the minimum diameter of the semiconductor wafer 3, considering tolerances of the size of the semiconductor wafer.

As shown in FIG. 2, the pusher stage 11 is fixedly supported by a shaft 13, and the lower end portion of the shaft 13 is connected to a shaft 15a of an actuator 15 such as a stepping motor through a joint 14. By actuating the actuator 15, the shaft 15a moves up and down to raise or lower the pusher stage 11. The shaft 15a of the actuator 15 has a lower end to which a plate 17 is attached. A distance measurement sensor 18 comprising an eddy current sensor is provided below the plate 17. The distance measurement sensor 18 is fixed to a support table 25 so that the distance L between the sensor 18 and the plate 17 fixed to the lower end of the shaft 15a can be measured.

The guide member 12 disposed radially outwardly of the pusher stage 11 is fixed to an inner cylinder 20. The inner cylinder 20 is fixed to an outer cylinder 21 comprising upper and lower cylindrical members coupled to each other by a snap ring 22 at the lower end of the inner cylinder 20. The lower end of the outer cylinder 21 is fixed to the support table 25. The support table 25 is connected to a rod 26a of an air cylinder 26 fixed to a base 27. By actuating the air cylinder 26, the rod 26a moves up and down to thereby raise or lower the support table 25. More specifically, by actuating the air cylinder 26 constituting a second actuating mechanism, the guide member 12 and the pusher stage 11 are integrally raised or lowered, and by actuating the actuator 15 constituting a first actuating mechanism, the pusher stage 11 is independently and solely raised or lowered.

Figure 5A:
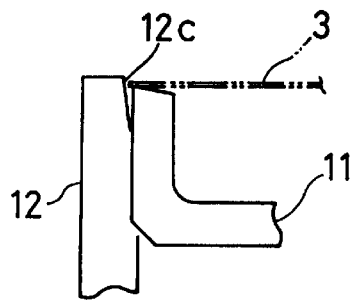
FIGS. 5A through 5G are vertical cross-sectional views of the transferring device which is in operation according to the first embodiment of the present invention.
Figure 5B:
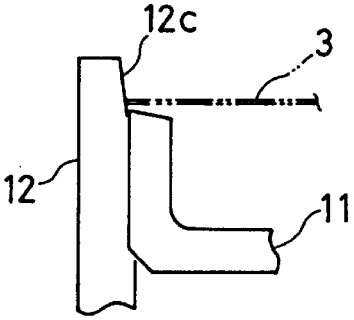

Next, the operation of the pusher 10 in the polishing apparatus will be described with reference to FIGS. 1 and 5A through 5G. The workpiece conveying robot 33 supporting a semiconductor wafer 3 to be polished conveys the semiconductor wafer 3 to the position above the pusher 10. At this time, the robot hand (not shown) of the workpiece conveying robot 33 supporting the semiconductor wafer approaches the position above the pusher 10 from the direction of the arrow B in FIG. 3. Then, the hand supporting the semiconductor wafer 3 is lowered, and the semiconductor wafer 3 is placed on the pusher stage 11 of the pusher 10 as shown in FIG. 5A. At this time, the pusher stage 11 is located in the position shown in FIG. 5A with respect to the guide surfaces 12c of the guide member 12, and the periphery of the semiconductor wafer 3 is not in contact with the guide surfaces 12c. Next, by actuating the actuator 15, the pusher stage 11 is solely lowered as shown FIG. 5B. At this time, a portion of the semiconductor wafer 3 which projects outwardly from the pusher stage 11 is brought into contact with the guide surfaces 12c of the guide member 12, and the semiconductor wafer 3 is pushed by the guide member 12 toward the center of the guide surfaces 12c while being lowered along the guide surfaces 12c. Finally, as shown in FIG. 5B, substantially all peripheral portions of the semiconductor wafer 3 are brought into contact with the guide surfaces 12c, and the positioning of the semiconductor wafer 3 is made with respect to the guide surfaces 12c. Therefore, the center of the semiconductor wafer 3 is aligned with the center of the guide surfaces 12c and the centering of the semiconductor wafer 3 is completed. The pusher stage 11 continues moving down after the semiconductor wafer 3 is placed on the guide surfaces 12c, and the support surface of the pusher stage 11 is away from the semiconductor wafer 3.

Figure 5C:
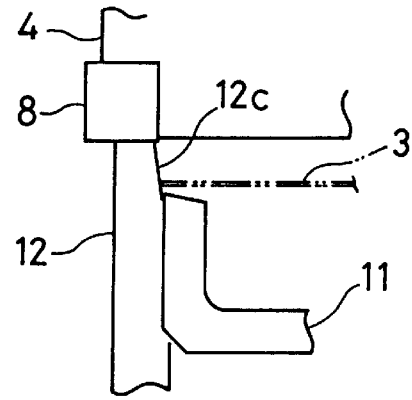
Figure 5D:
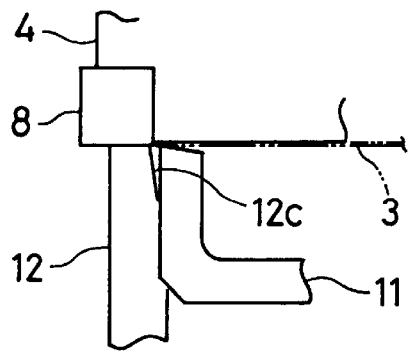

Next, by actuating the air cylinder 26, the guide member 12 and the pusher stage 11 are raised to the position where the top ring 4 is waiting as shown in FIG. 5C. The guide member 12 and the pusher stage 11 are raised until the upper surface of the guide member 12 contacts the lower surface of the retainer ring 8 attached to the peripheral portion of the top ring 4. In this case, the guide member 12 and the pusher stage 11 may be raised until the upper surface of the guide member 12 reaches a position adjacent to the lower surface of the retainer ring 8. Next, by actuating the actuator 15, the pusher stage 11 is solely raised, receives the semiconductor wafer 3 which has been centered by the guide surfaces 12c, and transfers the semiconductor wafer 3 to the top ring 4 as shown in FIG. 5D. At this time, because the top ring 4 and the pusher 10 are positioned in their suitable positions and the semiconductor wafer 3 is centered in the pusher 10, the semiconductor wafer 3 is received within the retainer ring 8 of the top ring 4 without a transfer error.

While the semiconductor wafer 3 is transferred to the top ring 4, the raising of the pusher stage 11 will stop if the semiconductor wafer 3 placed on the pusher stage 11 contacts a backing film attached to the lower surface of the top ring 4, or the retainer ring 8. At this time, the distance measurement sensor 18 measures the displacement of the pusher stage 11 in the direction of the Z axis. When the transfer of the semiconductor wafer is normally carried out, the measured value is within a predetermined value.

When the semiconductor wafer 3 is not normally placed in the retainer ring 8 because of misalignment of the semiconductor wafer, it affects the displacement of the pusher stage 11 in the direction of the Z axis, and the value of the displacement is measured by the distance measurement sensor 18. Whether the transfer of the semiconductor wafer has been normally carried out or not is judged in consideration of the allowable range in which measurement error or variation of the thickness of the semiconductor wafer is taken into account. FIG. 6 shows the relationship between the top ring and the semiconductor wafer which is in a normal condition (left side) and an abnormal operation (left side). If the measured value is within the predetermined range, the transfer of the semiconductor wafer is judged to have been carried out normally, and if the measured value is out of the predetermined range, i.e. the displacement $\Delta H$ in the Z axis direction occurs, it is judged that a transfer error has occurred. In the case where a transfer error occurs, the semiconductor wafer 3 is removed from the top ring 4 by injecting fluid such as water from the lower surface of the top ring 4, and the semiconductor wafer 3 is placed on the pusher stage 11 again. Thereafter, the operation shown in FIGS. 5A through 5D is carried out again. That is, the centering of the semiconductor wafer 3 is carried out again, and the semiconductor wafer 3 is transferred to the top ring 4 again.

The semiconductor wafer, which has been transferred from the pusher 10 to the top ring 4 as shown in FIG. 5D, is moved to the position above the turntable 2 by the swinging motion of the top ring unit 5. Thereafter, the semiconductor wafer 3 is pressed against the polishing surface of the turntable 2 to polish the semiconductor wafer 3. After polishing of the semiconductor wafer 3 is completed, the top ring 4 holding the semiconductor wafer 3 moves to the position above the pusher 10.

Figure 5E:
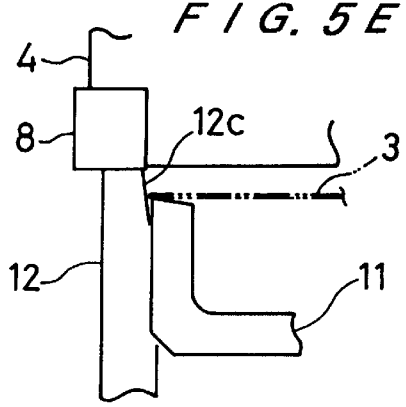

Next, by actuating the air cylinder 26, the guide member 12 and the pusher stage 11 are raised until the upper surface of the guide member 12 contacts the lower surface of the retainer ring 8 attached to the peripheral portion of the top ring 4 as shown in FIG. 5E. Thereafter, the semiconductor wafer 3 is removed by injecting fluid from the lower surface of the top ring 4. The semiconductor wafer which has been removed from the top ring 4 is placed on the pusher stage 11 as shown in FIG. 5E.

Figure 5F:
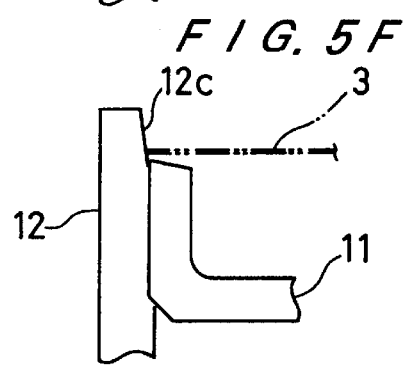

Next, by actuating the actuator 15, the pusher stage 11 is solely lowered as shown in FIG. 5F. At this time, a portion of the semiconductor wafer 3 which projects outwardly from the pusher stage 11 contacts the guide surfaces 12c of the guide member 12, and the semiconductor wafer 3 is pushed toward the center of the guide surfaces 12c while being lowered along the guide surfaces 12c. Finally, as shown in FIG. 5F, substantially all peripheral portions of the semiconductor wafer 3 are brought into contact with the guide surfaces 12c, and the positioning of the semiconductor wafer 3 is made with respect to the guide surfaces 12c. Therefore, the center of the semiconductor wafer 3 is aligned with the center of the guide surfaces 12c, and the centering of the semiconductor wafer 3 is completed. The pusher stage 11 continues moving down after the semiconductor wafer 3 is placed on the guide surfaces 12c, and the support surface of the pusher stage 11 is away from the semiconductor wafer 3.

Figure 5G:
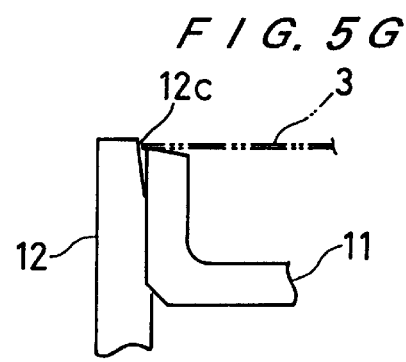

Next, by actuating the actuator 15, the pusher stage 11 is solely raised as shown in FIG. 5G, receives the semiconductor wafer 3 which has been centered by the guide surfaces 12c, and is further raised to the predetermined position as shown in FIG. 5G. In the state shown in FIG. 5G, the robot hand of the workpiece conveying robot 33 moves to the position below the semiconductor wafer 3. Thereafter, the hand is raised to receive the semiconductor wafer 3 from the pusher stage 11, and then the workpiece conveying robot 33 transfers the semiconductor wafer 3 to the workpiece reversing unit 35.

In the operation shown in FIGS. 5A through 5G, when transferring the semiconductor wafer between the pusher 10 and the robot hand, the semiconductor wafer is placed on the pusher stage 11 by the robot hand (see FIG. 5A), and the semiconductor wafer is received from the pusher stage 11 by the robot hand (see FIG. 5G). However, when transferring the semiconductor wafer between the pusher 10 and the robot hand, the semiconductor wafer may be placed on the guide surfaces 12c of the guide member 12 by the robot hand directly, and the semiconductor wafer is received from the guide surfaces 12c of the guide member 12 by the robot hand directly. In this case, the operation in FIGS. 5A and 5G is not required, and the operation will be started from the state shown in FIG. 5A and finished in the state shown in FIG. 5F.

In the polishing apparatus according to the first embodiment of the present invention, the pusher 10 can make a self-diagnosis by utilizing a function of detecting a transfer error with the distance measurement sensor 18. To be more specific, the number of the transfer errors which have occurred when transferring the semiconductor wafer 3 from the pusher 10 to the top ring 4 is counted, and if it exceeds a predetermined number of times, the pusher 10 and/or the semiconductor wafer are judged to be in an abnormal condition. For example, in case that three times or more of transfer errors per one time of transfer operation occur, the pusher 10 and/or the semiconductor wafer are judged to be in an abnormal condition, and then an alarm is activated. Thus, whether current conditions of the pusher 10 and the top ring 4 are normal or not can be judged. For example, whether the pusher 10 and/or the top ring 4 cannot be operated in a normal condition under initial setting due to secular variation can be judged.

In this embodiment, whether the semiconductor wafer is normally transferred from the pusher 10 to the top ring 4 is detected by the distance measurement sensor provided at the end of the shaft 13 of the pusher stage. It is also possible to detect the transfer error by a detecting device provided separately or discretely from the pusher. Further, it is possible to detect the transfer error from not only a direction perpendicular to the semiconductor wafer but also a direction parallel to the semiconductor wafer.

As means for detecting the transfer error, various conventional sensors including an eddy current sensor, an optical sensor employing a laser or the like, and a sensor employing a piezoelectric element can be used.

According to the first embodiment of the present invention, after the centering of the semiconductor wafer is achieved, the semiconductor wafer is transferred from the pusher to the top ring or from the pusher to the robot hand. Therefore, the transfer accuracy of the semiconductor wafer can be improved greatly, and transfer errors can be prevented from occurring.

Further, if a transfer error of the semiconductor wafer occurs, such error can be detected, and then the transfer operation of the semiconductor wafer can be done over again on the basis of the detected result. Therefore, damage to the semiconductor wafer caused by transfer error can be prevented from occurring.

Furthermore, by counting the number of the transfer errors, such errors occur a predetermined number of times or more, then the apparatus is judged to be in an abnormal condition. Thus, the judgement as to whether current conditions of the transfer device and the top ring are normal can be also made.

Next, a polishing apparatus according to a second embodiment of the present invention will be described with reference to FIGS. 7 through 12.

In the conventional transferring device of the polishing apparatus, in the case where the semiconductor wafer is transferred between the transferring device (pusher) and the top ring, the pusher has to be positionally adjusted highly accurately with respect to the top ring. Troublesome and time-consuming operations are required to set an accurate transfer position where the pusher is to be positioned.

Further, conventionally, the transferring device (pusher) has been positionally adjusted with respect to a single top ring. Recent polishing processes require high efficiency, and hence in some cases, a plurality of top rings are provided with respect to a single turntable. Therefore, in order to share a single transferring device (pusher) with a plurality of top rings, there has been a demand for a self-aligning type transferring device.

It is therefore an object of the second embodiment of the present invention to provide a polishing apparatus in which no previous strict positional adjustment is required between the transferring device and the top ring or the robot hand, and a transfer position can be easily set.

In the second embodiment shown in FIGS. 7 through 12, the same or similar parts as those in the first embodiment shown in FIGS. 1 through 6 are denoted by the same reference numerals.

Figure 7:
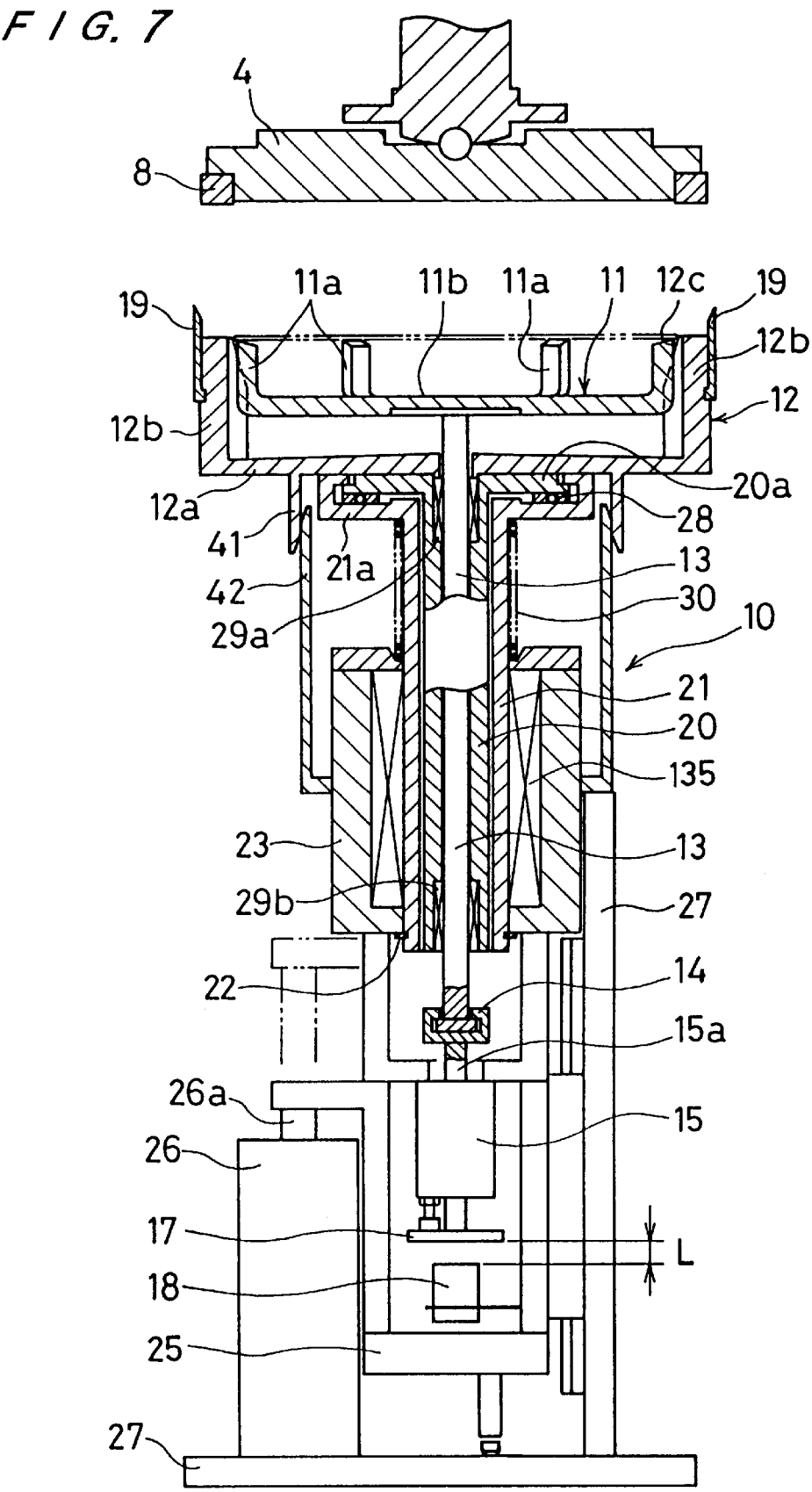
FIG. 7 is a vertical cross-sectional view of the transferring device according to a second embodiment of the present invention.
Figure 8:
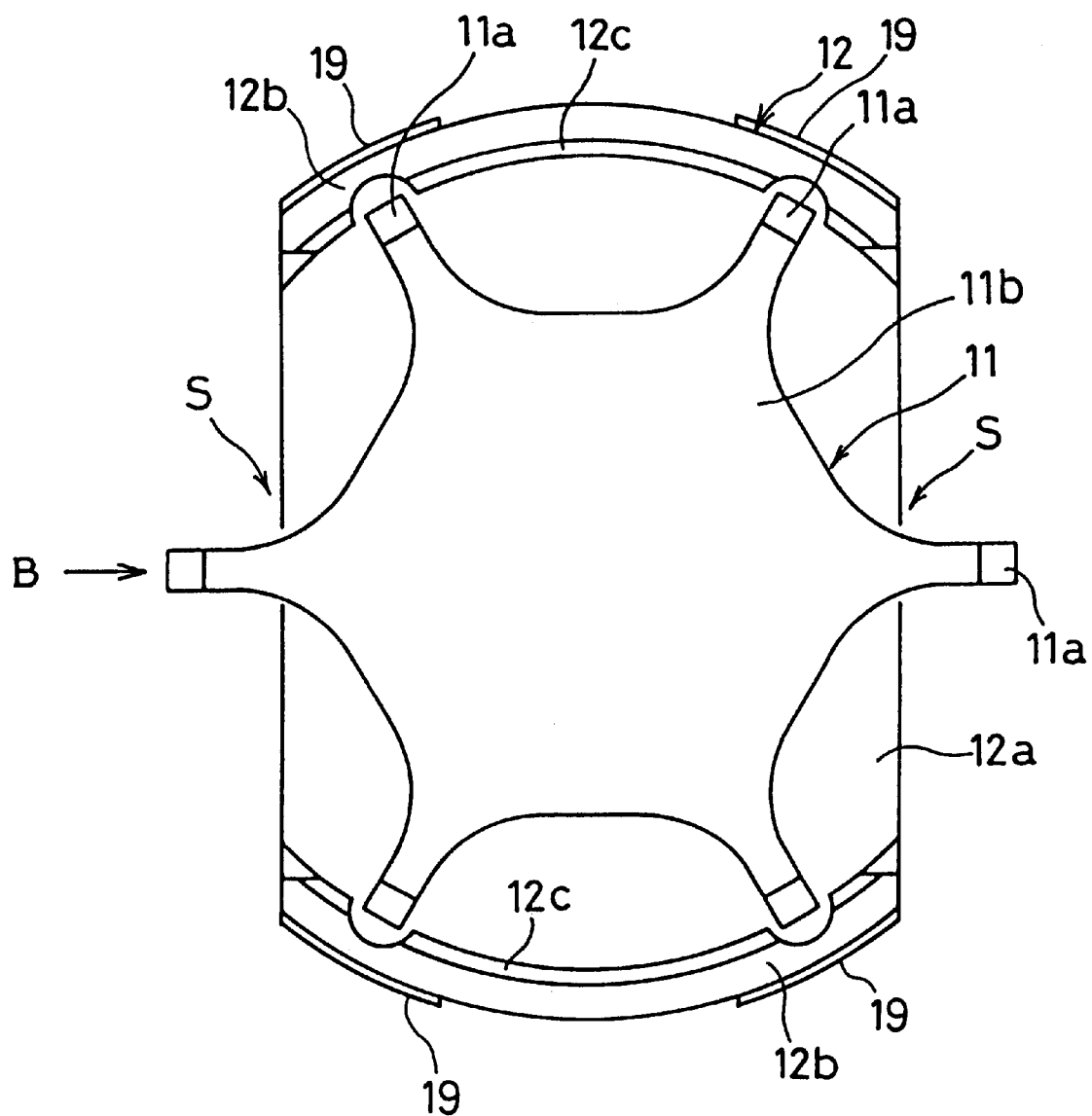
FIG. 8 is a plan view of the transferring device shown in FIG. 7.

FIGS. 7 and 8 are views showing a pusher 10 in a polishing apparatus. FIG. 7 is a cross-sectional view of the whole structure of the pusher 10, and FIG. 8 is a plan view of the pusher 10. FIG. 7 shows the state in which the top ring 4 is positioned above the pusher 10. A retainer ring 8 is provided on the lower peripheral portion of the top ring 4 to retain a semiconductor wafer therein.

As shown in FIGS. 7 and 8, the pusher 10 comprises a pusher stage 11 having six wafer supports 11a extending upwardly from a base portion 11b, and a guide member 12 positioned radially outwardly of the pusher stage 11 and having guide surfaces 12c of an inverted conical shape, i.e., an upwardly extending and outwardly sloped circular shape. The upper surfaces of the wafer supports 11a of the pusher stage 11 support the lower surface of the semiconductor wafer 3. The guide member 12 comprises a base 12a made of thin plate having an oblong shape, and a pair of guide portions 12b extending upwardly from the base 12a and having an arcuate horizontal cross-section. The guide portions 12b have respective guide surfaces 12c of an upwardly spreaded conical shape at the upper inner circumferential surfaces thereof. Guide plates 19 are fixed to the respective guide portions 12b for positioning the pusher stage 11 and the guide member 12 with respect to the top ring 4. The guide plates 19 constitute a first positioning mechanism. As shown in FIG. 8, the two opposite portions S of the guide member 12 where the guide portions 12b are not located are open so that a robot hand can be inserted therethrough.

The relationship between the guide surface 12c of the guide member 12 and the semiconductor wafer 3 in the second embodiment is the same as that in the first embodiment, as shown in FIG. 4. Therefore, the centering of the semiconductor wafer is made in the same manner as the first embodiment as shown in FIG. 4.

As shown in FIG. 7, the pusher stage 11 is fixedly supported by a shaft 13, and the lower end portion of the shaft 13 is connected to a rod 15a of an air cylinder 15 through a joint 14. The lower end portion of the shaft 13 is horizontally movable within the joint 14. By actuating the air cylinder 15, the rod 15a moves up and down to raise or lower the pusher stage 11. The rod 15a of the air cylinder 15 has a lower end to which a plate 17 is attached. A distance measurement sensor 18 comprising an eddy current sensor is provided below the plate 17. The distance measurement sensor 18 is fixed to a support table 25 so that the distance L between the sensor 18 and the plate 17 fixed to the lower end of the rod 15a can be measured.

The guide member 12 disposed radially outwardly of the pusher stage 11 is fixed to an inner cylinder 20. An outer cylinder 21 is provided outwardly of the inner cylinder 20. The outer cylinder 21 is supported by a spring 30 and a stroke bearing 135, and is vertically slidable with respect to the stroke bearing 135. A snap ring 22 provided on the lower end of the outer cylinder 21 contacts the lower end of a bearing case 23. The outer cylinder 21 is urged upwardly by the spring 30. The snap ring 22 contacts the lower end of the bearing case 23 to thereby prevent the outer cylinder 21 from being dislodged therefrom. That is, the uppermost position of the outer cylinder 21 with respect to the bearing case 23 is fixed by the snap ring 22. The bearing case 23 is fixed to the support table 25. The support table 25 is connected to a rod 26a of an air cylinder 26 fixed to a base 27. By actuating the air cylinder 26, the rod 26a moves up and down to thereby raise or lower the support table 25. More specifically, by actuating the air cylinder 26, the guide member 12 and the pusher stage 11 are integrally raised or lowered, and by actuating the air cylinder 15, the pusher stage 11 is independently and solely raised or lowered.

The outer cylinder 21 has a support portion 21a at the upper end thereof, and the upper portion 20a of the inner cylinder 20 is supported by the support portion 21a through a slider mechanism 28.

Figure 9:
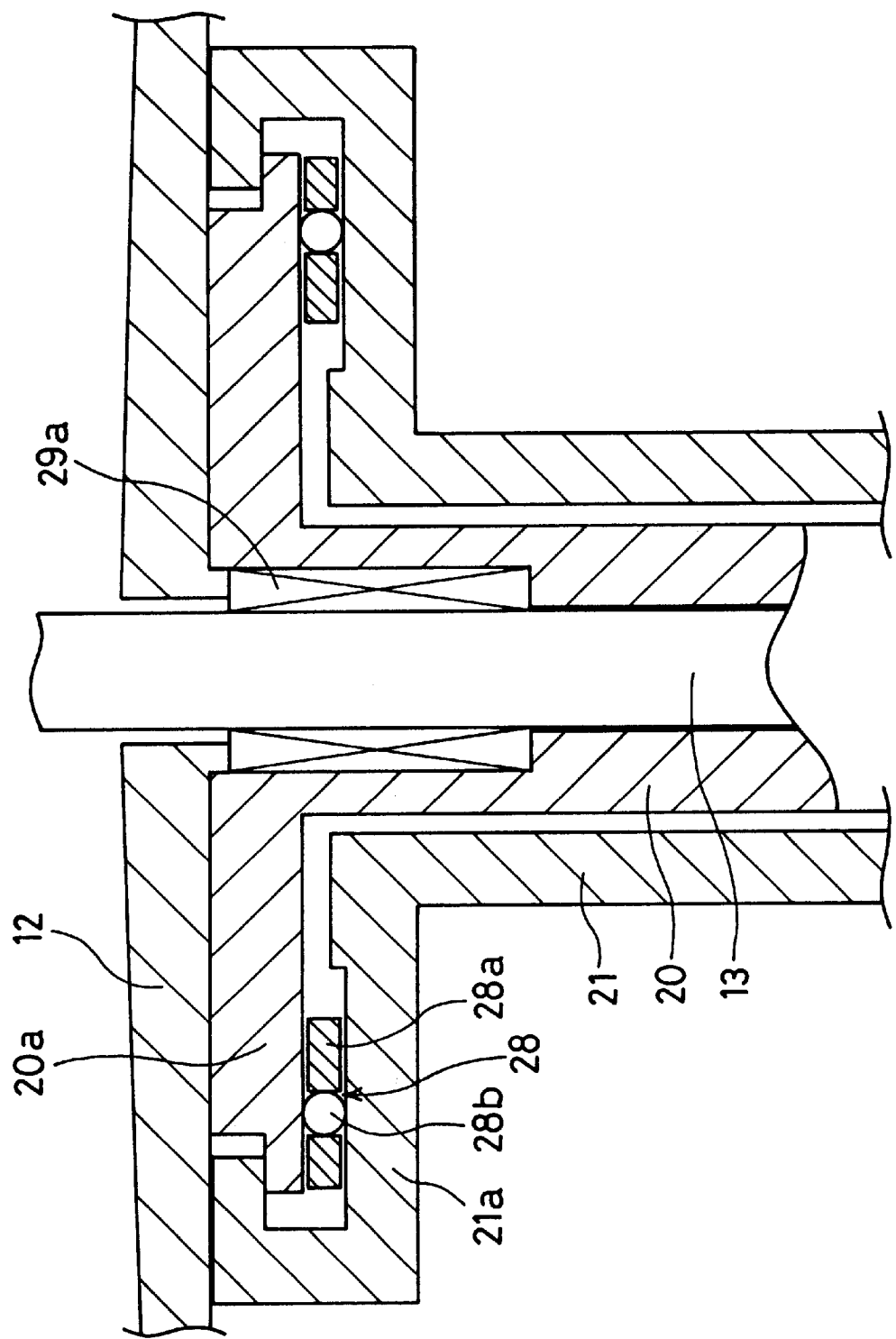
FIG. 9 is a cross-sectional view showing a slider mechanism and its associated members.
Figure 10:
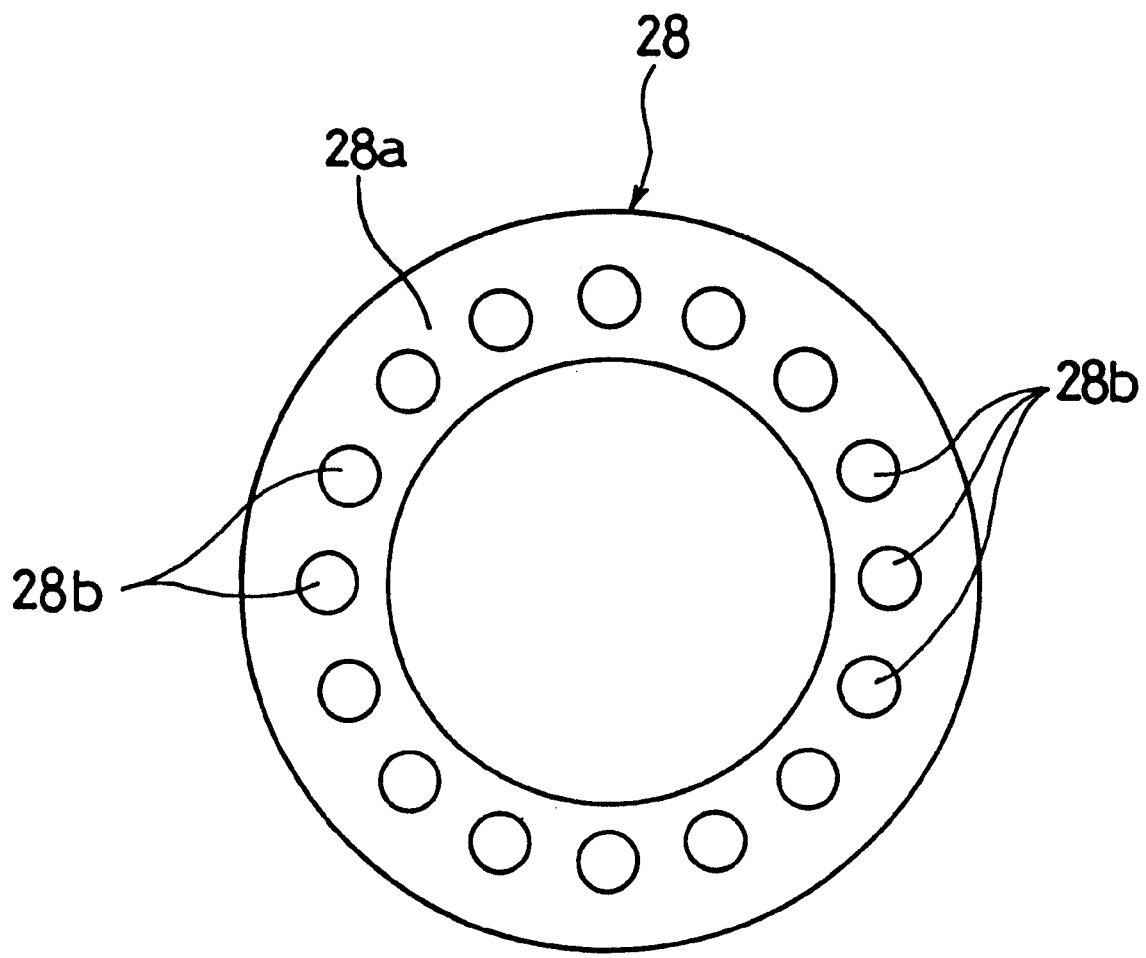
FIG. 10 is a plan view of the slider mechanism.

FIG. 9 is a cross-sectional view of the slider mechanism 28 and its associated components, and FIG. 10 is a plan view of the slider mechanism 28. As shown in FIGS. 9 and 10, the slider mechanism 28 comprises a retaining ring 28a made of an annular thin plate and having a number of ball holes, and a number of rolling elements 28b comprising balls retained by the retaining ring 28a. The guide member 12 is fixed to the upper portion 20a of the inner cylinder 20, and the shaft 13 supporting the pusher stage 11 is supported by the inner cylinder 20 through upper and lower bearings 29a and 29b (see FIGS. 7 and 9). Thus, both of the guide member 12 and the pusher stage 11 are horizontally movable by the slider mechanism 28. Although the slider mechanism 28 is freely movable in a horizontal direction, in order to prevent the slider mechanism 28 from moving excessively, the outer cylinder 21 has inner and outer circumferential steps to be contacted with the slider mechanism 28. When the guide member 12 and the pusher stage 11 move, the rolling elements 28b comprising the balls roll on the support portion 21a of the outer cylinder 21, and hence the guide member 12 and the pusher stage 11 move smoothly. An appropriate gap is defined between the lower end portion of the shaft 13 and the inner circumferential surface of the joint 14 so that the shaft 13 can move freely in a horizontal direction.

As shown FIG. 7, the guide member 12 has at its lower surface a guide plate 41 for positioning the pusher stage 11 and the guide member 12 with respect to the base 27 which is a stationary member. The base 27 has at its upper end an engaging member 42 which is engageable with the guide plate 41. The guide plate 41 and the engaging member 42 constitute a second positioning mechanism.

Figure 11A:
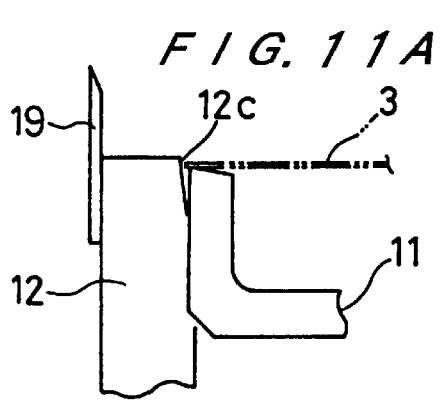
FIGS. 11A through 11G are vertical cross-sectional views of the transferring device which is in operation according to the second embodiment of the present invention.
Figure 11B:
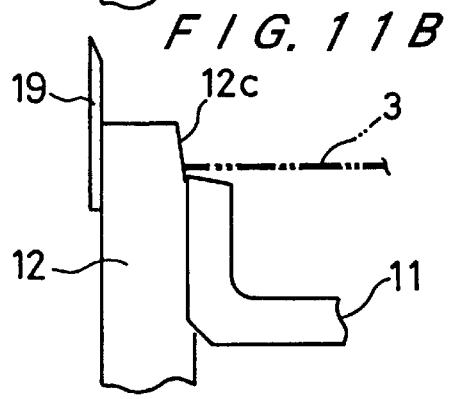

Next, the operation of the pusher 10 in the polishing apparatus will be described with reference to FIGS. 7 and 11A through 11G. The workpiece conveying robot 33 supporting a semiconductor wafer 3 to be polished conveys the semiconductor wafer 3 to the position above the pusher 10. At this time, the robot hand (not shown) of the workpiece conveying robot 33 supporting the semiconductor wafer approaches the position above the pusher 10 from the direction of the arrow B in FIG. 8. At this time, the pusher stage 11 and the guide member 12 are located in the lower position and their positioning is made with respect to the base 27 by engagement of the guide plate 41 and the engaging member 42. This state is shown in FIG. 7. Then, the hand supporting the semiconductor wafer 3 is lowered, and the semiconductor wafer 3 is placed on the pusher stage 11 of the pusher 10 as shown in FIG. 11A. At this time, the pusher stage 11 is located in the position shown in FIG. 11A with respect to the guide surfaces 12c of the guide member 12, and the periphery of the semiconductor wafer 3 is not in contact with the guide surfaces 12c. Next, by actuating the air cylinder 15, the pusher stage 11 is solely lowered as shown FIG. 11B. At this time, a portion of the semiconductor wafer 3 which projects outwardly from the pusher stage 11 is brought into contact with the guide surfaces 12c of the guide member 12, and the semiconductor wafer 3 is pushed by the guide member 12 toward the center of the guide surfaces 12c while being lowered along the guide surfaces 12c. Finally, as shown in FIG. 11B, substantially all peripheral portions of the semiconductor wafer 3 are brought into contact with the guide surfaces 12c, and the semiconductor wafer 3 is positioned with respect to the guide surfaces 12c. Therefore, the center of the semiconductor wafer 3 is aligned with the center of the guide surfaces 12c and the centering of the semiconductor wafer 3 is completed. The pusher stage 11 continues moving down after the semiconductor wafer 3 is placed on the guide surfaces 12c, and the support surface of the pusher stage 11 is away from the semiconductor wafer 3.

Figure 11C:
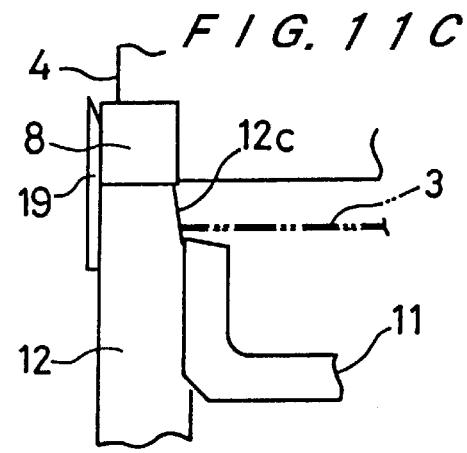
Figure 12:
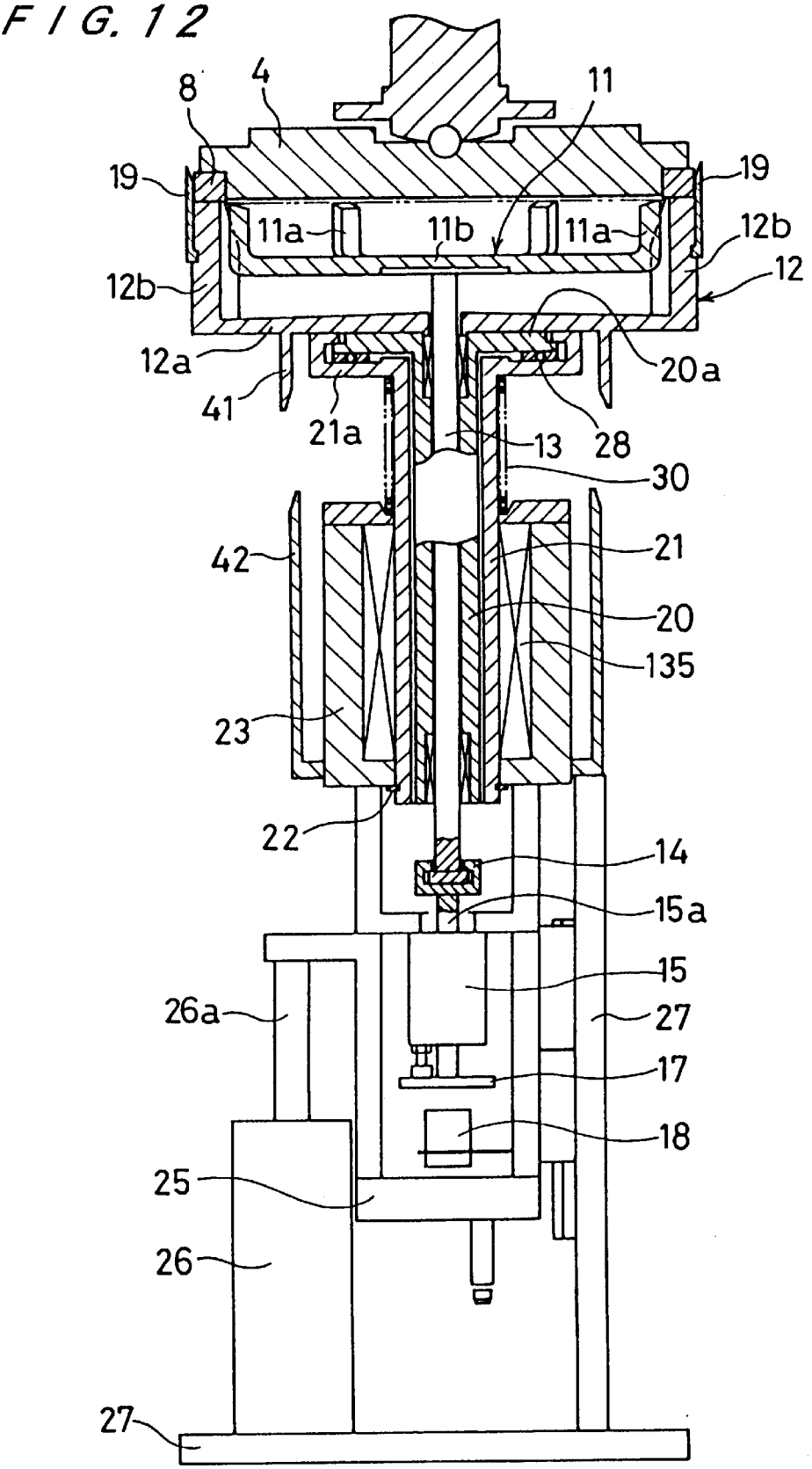
FIG. 12 is a vertical cross-sectional view showing an operation of the transferring device shown in FIG. 7.

Next, by actuating the air cylinder 26, the guide member 12 and the pusher stage 11 are raised to the position where the top ring 4 is waiting as shown in FIG. 11C. The guide member 12 and the pusher stage 11 are raised until the upper surface of the guide member 12 contacts the lower surface of the retainer ring 8 attached to the peripheral portion of the top ring 4. At this time, the spring 30 shrinks by several millimeters. The guide member 12 is stably brought into contact with the top ring 4 at the entire circumferential portion thereof. At this time, the guide plates 19 are fitted over the retainer ring 8 to thereby allow the pusher stage 11 and the guide member 12 to be positioned with respect to the top ring 4. While the positioning of the pusher stage 11 and the guide member 12 is being made, the pusher stage 11 and the guide member 12 move horizontally by the slider mechanism 28, and hence optimum positioning of the pusher stage 11, the guide member 12 and the top ring 4 are automatically performed. This state is shown in FIG. 12.

Figure 11D:
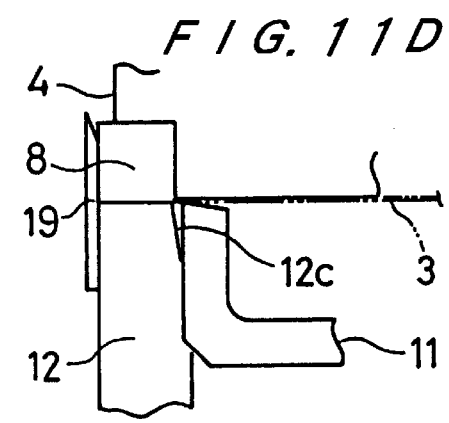

Next, by actuating the air cylinder 15, the pusher stage 11 is solely raised, receives the semiconductor wafer 3 which has been centered by the guide surfaces 12c, and transfers the semiconductor wafer 3 to the top ring 4 as shown in FIG. 11D. At this time, because the top ring 4 and the pusher 10 are positioned in their suitable positions and the semiconductor wafer 3 is centered in the pusher 10, the semiconductor wafer 3 is received within the retainer ring 8 of the top ring 4 without a transfer error. While the semiconductor wafer 3 is transferred to the top ring 4, the raising of the pusher stage 11 will stop if the semiconductor wafer 3 placed on the pusher stage 11 contacts a backing film attached to the lower surface of the top ring 4, or the retainer ring 8. At this time, the distance measurement sensor 18 measures the displacement of the pusher stage 11 in the direction of the Z axis. When the transfer of the semiconductor wafer is normally carried out, the measured value is within a predetermined value.

When the semiconductor wafer 3 is not normally placed in the retainer ring 8 because of misalignment of the semiconductor wafer, it affects the displacement of the pusher stage 11 in the direction of the Z axis, and the value of the displacement is measured by the distance measurement sensor 18. Whether the transfer of the semiconductor wafer has been normally carried out or not is judged considering an allowable range in which measurement error or variation of the thickness of the semiconductor wafer is taken into account. If the measured value is within the predetermined range, the transfer of the semiconductor wafer is judged to have been carried out normally, and if the measured value is out of the predetermined range, it is judged that a transfer error has occurred (see FIG. 6). In the case where a transfer error occurs, the semiconductor wafer 3 is removed from the top ring 4 by injecting fluid such as air from the lower surface of the top ring 4, and the semiconductor wafer 3 is placed on the pusher stage 11 again. Thereafter, the operation shown in FIGS. 11A through 11D is carried out again. That is, the centering of the semiconductor wafer 3 is carried out again, and the semiconductor wafer 3 is transferred to the top ring 4 again.

The semiconductor wafer, which has been transferred from the pusher 10 to the top ring 4 as shown in FIG. 11D, is moved to the position above the turntable 2 by the swinging motion of the top ring unit 5. Thereafter, the semiconductor wafer 3 is pressed against the polishing surface of the turntable 2 to polish the semiconductor wafer 3. After polishing of the semiconductor wafer 3 is completed, the top ring 4 holding the semiconductor wafer 3 moves to the position above the pusher 10.

Figure 11E:
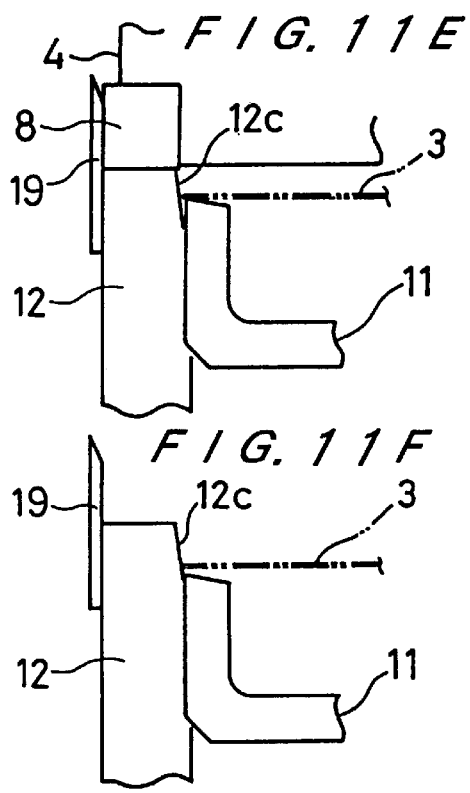

Next, by actuating the air cylinder 26, the guide member 12 and the pusher stage 11 are raised until the upper surface of the guide member 12 contacts the lower surface of the retainer ring 8 attached to the peripheral portion of the top ring 4 as shown in FIG. 11E. At this time, the spring 30 shrinks by several millimeters. At this time, the positioning of the top ring 4, the guide member 12 and the pusher stage 11 are carried out by engagement of the guide plates 19 and the retainer ring 8 (see FIG. 12). At this time, the pusher stage 11 is in such a state that it is lowered with respect to the guide member 12. Thereafter, the semiconductor wafer 3 is removed by injecting fluid from the lower surface of the top ring 4. The semiconductor wafer which has been removed from the top ring 4 is placed on the pusher stage 11 as shown in FIG. 11E.

Figure 11F:
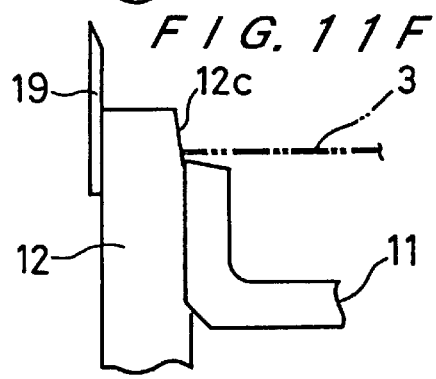

Next, by actuating the air cylinder 26 to lower the pusher stage 11 and the guide member 12, the spring 30 is completely extended from the shrunk state, and thus the pusher stage 11 is lowered with respect to the guide member 12 by several millimeters, as shown in FIG. 11E. At this time, a portion of the semiconductor wafer 3 which projects outwardly from the pusher stage 11 contacts the guide surfaces 12c of the guide member 12, and the semiconductor wafer 3 is pushed toward the center of the guide surfaces 12c while being lowered along the guide surfaces 12c. Finally, as shown in FIG. 11F, substantially all peripheral portions of the semiconductor wafer 3 are brought into contact with the guide surfaces 12c, and the positioning of the semiconductor wafer 3 is made with respect to the guide surfaces 12c. Therefore, the center of the semiconductor wafer 3 is aligned with the center of the guide surfaces 12c, and the centering of the semiconductor wafer 3 is completed. Because the spring 30 is extended, the guide member 12 is raised, and after the semiconductor wafer 3 is placed on the guide surfaces 12c, the support surface of the pusher stage 11 is away from the semiconductor wafer 3.

Figure 11G:
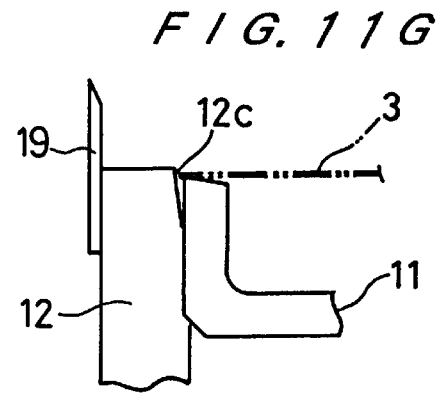

Next, by actuating the air cylinder 15, the pusher stage 11 is solely raised as shown in FIG. 11G, receives the semiconductor wafer 3 which has been centered by the guide surfaces 12, and is further raised to the predetermined position. At this time, the pusher stage 11 and the guide member 12 are located in the lower position, and are positioned with respect to the base 27 by engagement of the guide plate 41 and the engaging member 42. In the state shown in FIG. 11G, the robot hand of the workpiece conveying robot 33 moves to the position below the semiconductor wafer 3. Thereafter, the hand is raised to receive the semiconductor wafer 3 from the pusher stage 11, and then the workpiece conveying robot 33 transfers the semiconductor wafer to the workpiece reversing unit 35.

According to the second embodiment of the present invention, after the centering of the semiconductor wafer is made, the semiconductor wafer is transferred from the pusher to the top ring or from the pusher to the robot hand. Therefore, the transfer accuracy of the semiconductor wafer can be improved greatly, and the transfer error thereof can be prevented from occurring.

Further, when transferring the semiconductor wafer, positional adjustment between the pusher and the top ring can be accurately made, the transfer accuracy of the semiconductor wafer can be improved, and transfer errors thereof can be prevented from occurring.

Furthermore, positional adjustment between the pusher and the top ring can be accurately and automatically made, and hence no previous strict positional adjustment is required between the pusher and the top ring.

Although certain preferred embodiments of the present invention have been shown and described in detail, it should be understood that various changes and modifications may be made therein without departing from the scope of the appended claims.

What is claimed is:

1. A polishing apparatus for polishing a surface of a workpiece comprising:
   a turntable having a polishing surface;
   a top ring for supporting the workpiece to be polished and pressing the workpiece against said polishing surface; and
   a transferring device for transferring the workpiece between said top ring and said transferring device;
   said transferring device comprising:
      a stage having a support surface for supporting the workpiece;
      a first actuating mechanism for moving said stage in a vertical direction; and
      a guide member disposed radially outwardly of said stage and having a guide surface of an inverted conical shape to center the workpiece by bringing a periphery of the workpiece into contact with said guide surface.

2. A polishing apparatus according to claim 1, wherein after centering of the workpiece is made by bringing a periphery of the workpiece into contact with said guide surface, the workpiece is transferred to said top ring by raising said stage.

3. A polishing apparatus according to claim 1, wherein after the workpiece is transferred from said top ring to said transferring device, centering of the workpiece is made by bringing a periphery of the workpiece into contact with said guide surface.

4. A polishing apparatus according to claim 1, wherein said centering of the workpiece is conducted by lowering the workpiece along said guide surface until substantially all periphery of the workpiece is brought into contact with said guide surface.

5. A polishing apparatus according to claim 4, wherein said lowering of the workpiece is conducted by lowering said stage which supports the workpiece.

6. A polishing apparatus according to claim 1, further comprising:
   a second actuating mechanism for moving said stage and said guide member;
   wherein before the workpiece is transferred to said top ring, said guide member and said stage are raised until an upper surface of said guide member contacts a lower surface of a retainer ring of said top ring or reaches a position adjacent to said lower surface of said retainer ring.

7. A polishing apparatus according to claim 1, further comprising:
   a slider mechanism for moving said stage and said guide member within a horizontal plane; and
   a first positioning mechanism for positioning said stage and said guide member with respect to said top ring when the workpiece is transferred between said transferring device and said top ring.

8. A polishing apparatus according to claim 7, wherein said slider mechanism comprises a plurality of rolling elements retained by a retainer.

9. A polishing apparatus according to claim 7, further comprising:
   second positioning mechanism for positioning said stage and said guide member with respect to a stationary part when said stage and said guide member are located at a lower position.

10. A polishing apparatus for polishing a surface of a workpiece comprising:
   a turntable having a polishing surface;
   a top ring for supporting the workpiece to be polished and pressing the workpiece against said polishing surface; and a transferring device for transferring the workpiece between said top ring and said transferring device;

said transferring device comprising:
a stage having a support surface for supporting the workpiece;
a first actuating unit for moving said stage in a vertical direction;
a guide member disposed radially outwardly of said stage and having a guide surface; and
a sensor for detecting a vertical position of said stage;
wherein when said stage supporting the workpiece is raised toward said top ring to transfer the workpiece to said top ring, said sensor detects whether said stage is raised up to a predetermined position or not.

11. A polishing apparatus according to claim 10, wherein when said sensor detects that said stage is not raised up to said predetermined position, the workpiece is returned to said support surface of said stage by removing the workpiece from said top ring.

12. A polishing apparatus according to claim 11, wherein said guide surface is of an inverted conical shape; and
wherein after the workpiece is returned to said support surface of said stage, centering of the workpiece is made by bringing a periphery of the workpiece into contact with said guide surface, and then the workpiece is transferred to said top ring by raising said stage.

13. A polishing apparatus according to claim 11, wherein the number of transfer errors, in which said stage is not raised up to said predetermined position, detected by said sensor is counted; and
wherein condition of at least one of said transferring device and said top ring is judged on the basis of said number of transfer errors.

14. A method of polishing a surface of a workpiece in a polishing apparatus;
said polishing apparatus comprising:
a turntable having a polishing surface;
a top ring for supporting the workpiece to be polished and pressing the workpiece against said polishing surface, to polish the workpiece; and
a transferring device for transferring the workpiece between said top ring and said transferring device;
said method comprising;
transferring the workpiece from said transferring device to said top ring;
detecting whether the workpiece is held within a predetermined position of said top ring;
returning the workpiece to said transferring device by removing the workpiece frog said top ring when the workpiece is not held within said predetermined position of said top ring;
aligning a center of the workpiece with a center of said top ring by said transferring device; and
transferring the workpiece from said transferring device to said top ring.

15. A method according to claim 14, wherein said detecting is conducted by a sensor which detects that a stage supporting the workpiece in said transferring device is not raised up to a predetermined position.

16. A method according to claim 14, wherein said aligning is conducted by bringing a periphery of the workpiece into contact with an inverted conical surface provided in said transferring device.

* * * * *

UNITED STATES PATENT AND TRADEMARK OFFICE
CERTIFICATE OF CORRECTION

PATENT NO.    : 6,312,312 B1
DATED         : November 6, 2001
INVENTOR(S)   : Tetsuji Togawa et al.

It is certified that error appears in the above-identified patent and that said Letters Patent is hereby corrected as shown below:

<u>Column 16,</u>
Line 16, change "returning the workpiece frog said" to -- returning the workpiece from said --.

Signed and Sealed this

Ninth Day of April, 2002

*Attest:*

JAMES E. ROGAN
*Director of the United States Patent and Trademark Office*

*Attesting Officer*